(12) United States Patent
Stav

(10) Patent No.: US 12,514,360 B2
(45) Date of Patent: Jan. 6, 2026

(54) WRIST-WORN DEVICE FOR DISPENSING OBJECTS INTO THE HAND ON WHICH IT IS WORN USING THE SAME HAND

(71) Applicant: Iyar Stav, Tel Aviv (IL)

(72) Inventor: Iyar Stav, Tel Aviv (IL)

( * ) Notice: Subject to any disclaimer, the term of this patent is extended or adjusted under 35 U.S.C. 154(b) by 50 days.

(21) Appl. No.: 18/714,835

(22) PCT Filed: Dec. 5, 2022

(86) PCT No.: PCT/IL2022/051289
§ 371 (c)(1),
(2) Date: May 30, 2024

(87) PCT Pub. No.: WO2023/112019
PCT Pub. Date: Jun. 22, 2023

(65) Prior Publication Data
US 2025/0024920 A1    Jan. 23, 2025

(30) Foreign Application Priority Data

Dec. 14, 2021    (IL) .......................................... 288992

(51) Int. Cl.
*A45F 5/00* (2006.01)
*A01K 5/01* (2006.01)

(52) U.S. Cl.
CPC .............. *A45F 5/00* (2013.01); *A01K 5/0114* (2013.01); *A45F 2005/008* (2013.01)

(58) Field of Classification Search
CPC ..... A45F 5/00; A45F 2005/008; A01K 5/0114
USPC .......... 224/219, 267; 221/281; 222/410, 411
See application file for complete search history.

(56) References Cited

U.S. PATENT DOCUMENTS

| 4,176,767 A | 12/1979 | Franche, IV |
| 4,736,876 A | 4/1988 | Kriss |
| 4,781,315 A | 11/1988 | Nordskog |
| 5,484,085 A | 1/1996 | Bennett |

(Continued)

FOREIGN PATENT DOCUMENTS

| GB | 2308466 A | 6/1997 |
| GB | 2412567 A | 10/2005 |
| GB | 2450361 A | 12/2008 |

OTHER PUBLICATIONS

PCT International Search Report for International Application No. PCT/IL2022/051289, mailed Feb. 2, 2023, 3pp.

(Continued)

*Primary Examiner* — Justin M Larson
(74) *Attorney, Agent, or Firm* — The Roy Gross Law Firm, LLC; Roy D. Gross

(57) ABSTRACT

The present invention discloses a wrist/forearm worn dispensing device that is configured to dispense objects into the hand on which it is worn by using the same hand. The device comprising a strap for wearing it around the wrist or forearm, and a storage container that can be filled with dispensable objects through an inlet opening. An activation handle extends from the device towards the fingers of the hand on which it is worn in a position allowing the activation means to be engaged by folding of the fingers to press it, thereby triggering a dispensing mechanism disposed within the device to release at least one dispensable object out of the device through an outlet opening and into the palm of the hand on which the device is worn.

22 Claims, 11 Drawing Sheets

(56) References Cited

U.S. PATENT DOCUMENTS

| | | |
|---|---|---|
| 5,961,066 A | 10/1999 | Hambleton |
| 6,085,955 A | 7/2000 | Hicks et al. |
| 6,988,464 B1 | 1/2006 | Rutledge |
| 7,004,111 B2 * | 2/2006 | Olson .................. A01K 5/0114 224/267 |
| 7,735,682 B1 | 6/2010 | Cassel et al. |
| 2007/0088298 A1 | 4/2007 | Powers et al. |
| 2008/0251539 A1 | 10/2008 | Yapaola et al. |
| 2010/0095896 A1 | 4/2010 | Van Wye |
| 2017/0318788 A1 | 11/2017 | Blaylock |
| 2018/0263436 A1 | 9/2018 | Bartrug et al. |

OTHER PUBLICATIONS

PCT Written Opinion for International Application No. PCT/IL2022/051289, mailed Feb. 2, 2023, 4pp.

* cited by examiner

WRIST-WORN DEVICE FOR DISPENSING OBJECTS INTO THE HAND ON WHICH IT IS WORN USING THE SAME HAND

CROSS REFERENCE TO RELATED APPLICATIONS

This application is a National Phase of PCT Patent Application No. PCT/IL2022/051289 having International filing date of Dec. 5, 2022, which claims the benefit of priority of Israeli Patent Application No. 288992, filed Dec. 14, 2021, the contents of which are all incorporated herein by reference in their entirety.

FIELD OF THE INVENTION

The present invention relates generally to portable dispensing devices, and specifically, to wrist-worn device for dispensing objects into the hand on which it is worn by using the same hand.

BACKGROUND OF THE INVENTION

There are plenty of daily or other activities that require repetitive reaching of the hand to lift small objects before making the intended use of such objects.

These activities can include eating, feeding, doing construction, industrial or house works with small items such as nails, pins or screws, training pets with treats, administering drugs, loading ammunition into a firearm, performing medical procedures, and countless of other activities.

Due to the repetitive nature of such actions, a person performing these tasks is required to repetitively reach the hand intended to perform the task toward a specific area where the objects are concentrated, such as a toolbox, a pouch, a pocket or another container.

Such a repetitive motion for reaching toward a container of some sort to lift a small object may be inconvenient and even hurtful after many repetitions, especially if the container is placed outside the natural range of movement of the arm. Even if the container is placed right beneath the hand, such as being hung on the waist, a repetitive motion is still required to reach toward it. Moreover, using the fingers to lift a single small object from a pile of small objects can be in itself inconvenient, cumbersome and slow.

For some tasks, dispensers have become a common solution for the latter, such as coin dispensers used by various merchants to easily dispense coins into hand. However, even such dispensers require the person using them to repetitively reach their arm toward them.

Furthermore, tasks that require reaching the hand to lift small objects can be extremely uncomfortable or even dangerous, even if not being repetitive, if they are to be carried out in risky conditions, such as while driving a bicycle or a motorcycle or during high altitude construction work or military operation.

One example of a task that requires repetitive reaching of the hand to lift a small object is pet training, and particularly, dog training. Typical dog training involves a repetitive process of the person training the dog giving it a command to perform some action, and if the dog complies, the person then rewards it with a small edible treat or snack. Since this requires a repetitive action of lifting a snack and handing it over to the dog that undergoes training, professional dog trainers as well as dog owners commonly use a pouch containing treats during dog training. This pouch is usually hung around the waist line of the person training the dog to allow them to reach into it and grab a dog treat every time they want to reward the dog they are training.

Like previous examples, the dog training pouch too requires a repetitive motion of the arm and hand, and repetitive folding and straightening of the elbow when inserting the hand into the pouch and pulling it out with the dog treat in it. This repetitive action as well is inconvenient and may even result in joint pain or damage. Additionally, dog training pouches have several shortcomings stemming from the nature of dog training. On one hand, they may be open too wide, which may cause the dog undergoing training or other dogs in its vicinity to try snatching dog treats from the pouch or result in dog treats falling off of the pouch during active training, or on the other hand, if their opening is too narrow, it makes it more inconvenient and slow to pull dog treats from it, to the extent of compromising the effectiveness of the dog training.

An ideal solution for the disadvantages specified above would have been a wrist/forearm worn dispensing device that is capable of releasing small objects into the hand on which it is worn without having to change the position of neither the hand on which it is worn nor the opposing hand, as disclosed herein.

However, while there are several publications in the prior art that disclose wrist wearable dispensers, neither of which discloses a wrist-worn dispensing device operable by the same hand on which it is worn. For example, GB2308466A discloses a wrist-worn medication dispenser that requires the person wearing it to reach its opposing hand to the dispenser in order dispense medications from it. Similarly, GB2412567A discloses a wrist-worn fluid dispenser that can be activated only by reaching the opposing hand to operate it. U.S. Pat. No. 4,736,876A as well discloses a liquid dispenser with several containers that can be worn on the wrist, but can be activated only by the opposing hand. U.S. Pat. Nos. 5,961,066A and 6,085,955A both disclose a wrist-worn tape dispenser for dispensing adhesive tapes, which can be operated only by reaching the opposing hand to pull the tape from the dispenser. U.S. Pat. No. 7,735,682B1 discloses a wrist-worn wipes dispenser, which as well, can be operated only by reaching the opposing hand to pull the wipes from the dispenser. Lastly, US2007088298A1 discloses a wrist-mounted device for dispensing a disinfectant, moisturizer or other hand medicament into the hand of its wearer, however, this device too can by operated only by reaching the opposing hand to activate it.

As for the field of dog training specifically, while there are some publications in the prior art that disclose several types of dog treat dispensers, none of which teach, suggest or motivate the use of a wrist/forearm worn pet treat dispenser, let alone a wrist/forearm worn pet treat dispenser that can be activated by the same hand on which it is worn.

For example, GB2450361A discloses a hand-held pet treat dispenser, however, the device disclosed therein is not intended to be worn on hand. U.S. Pat. No. 4,176,767A discloses a stationary pet treat dispenser which is not intended to be hand held or wrist worn. U.S. Pat. No. 6,988,464B1 discloses a hand-held pet treat dispenser that cannot be worn on the wrist or forearm. Similarly, US2010095896A1 discloses a remotely controlled pet treat dispenser that cannot be worn on the wrist or forearm.

SUMMARY OF THE INVENTION

The present invention discloses a novel wrist/forearm worn dispensing device operable by the hand on which it is worn for dispending objects into same hand.

As can be inferred from the background of the invention, none of the existing prior art publications discloses a wrist-worn dispensing device that can be activated by the same hand on which it is worn, not to mention such a device that releases objects into the palm of the hand on which it is worn when activated by the same hand. In fact, none of the prior art publications known in this field of art or any combination between them could teach, suggest or motivate the person skilled in the art to develop such a wrist-worn dispensing device.

One of the main advantages of the device subject of the present invention is its ability to allow a person using the device to instantly and repetitively have desired small objects placed in their palm without requiring any movement other than folding of the fingers to activate the device, thereby obviating the need to reach the hand toward the container where the desired objects are concentrated and pick up the desired objects. Thanks to this single-hand mechanism of operation, user of the device can obtain hand hold of objects in-use stored within a closed and secured container without any movement of the arm or body and while keeping its second hand free.

Such a device that allows instant and repetitive hand hold of objects in-use without requiring any movement of the arm or body can be highly useful for multiple purposes, such as instant access to edible dog treats during dog training. It can also be used by professional athletes like long-distance runners, cyclists, skiers or race drivers for easy dispensing of nutrients or other essential consumables without requiring change in posture or any movement of the hand. This device can be also useful for military or paramilitary personnel, particularly special operation units, for easy dispensing of ammunition, micro tracking devices or other essential warfare articles. Furthermore, it can useful for construction, installation and maintenance workers, particularly those performing risky procedures in high altitudes, as it allows them to easily dispense screws, pins or other construction articles into their hand with minimum movement. Additionally, this device can be useful for surgeons, paramedics, veterinarians or other medical personnel by allowing them, instantly and without removing hands from their position, to dispense small medical items such as gauzes, sponges, surgical pins, surgical adhesives, surgical sutures, ampoules, vials, tablets or stunts while performing medical procedures.

In addition, such a device can be particularly useful for handicapped people, such as people with limited range of movement of their arms or hands, people who one of their hands is paralyzed or amputees who have lost one of their hands.

The above examples are not intended to be exhaustive or to limit the use of the device subject of the present invention to the mentioned purposes. The scope of the invention is not limited to any specific use or purpose and is intended to cover any possible use or purpose of the device described herein.

PREFERRED EMBODIMENTS OF THE INVENTION

One preferred embodiment of the present invention is a wrist-worn dispensing device, comprising: a dispenser housing, a strap for fixing said dispenser housing around wrist, a storage chamber within dispenser housing for containing dispensable objects, an inlet opening in said dispenser housing in connection with said storage chamber for filling said storage chamber with dispensable objects, an outlet opening in said dispenser housing for release of dispensable objects contained in said storage chamber, a dispensing mechanism disposed within dispenser housing and an activation means extending from said dispenser housing in proximity with said outlet opening.

The dispenser housing preferably has an elongated shape which can be conveniently hung in parallel to the wrist and distal part of the forearm. It is preferably fabricated from a relatively lightweight solid material, such as plastic or aluminum or any other suitable material known in the prior art.

The strap can be hung on two lugs or elongated apertures disposed in both sides of the dispenser housing, or otherwise may be inserted through a single elongated aperture crossing through the bottom part of the dispenser housing parallel to the plane of the dispenser housing resting on the wrist. The strap may be of any type that allows fastening around the wrist, such as Velcro, clip buckle, tongue buckle or any other suitable fastening mechanism known in the prior art.

The storage chamber is intended to contain the dispensable objects, while the inlet opening provides access for filling the storage chamber with dispensable objects. The inlet opening is preferably securely closable using a flippable lid installed on a hinge, a removable cover, a cap or any type of closure know in the prior art that allows simple and quick open and closure of the inlet opening. The inlet opening is preferably disposed in an area of the dispenser housing proximal to the upper part of the forearm and accessible to the user when the dispenser housing is fixed around the wrist.

The outlet opening is preferably disposed on the end of the dispenser housing proximal to the palm of the hand on which the dispenser housing is worn, on a plane vertical to the plane on which the dispenser housing rests while fixed around the wrist, such that folding of the hand places the palm of the hand in a position facing the outlet opening.

The dispensing mechanism can be any mechanism known in the prior art that can be used for releasing a limited quantity of dispensable objects stored in the storage chamber when activated, including mechanical mechanisms and electro-mechanical mechanisms.

The activation means is operatively coupled to the dispensing mechanism and configured to activate said dispensing mechanism upon being pressed. The activation means may be a handle, a lever, a button or any other component that can be used by folding of the fingers to activate the dispensing mechanism within the dispenser housing.

When the dispenser housing is fixed on palm side of the wrist, the activation means extends from the dispenser housing towards the fingers of the hand on which the dispenser housing is worn, and the outlet opening is positioned between the said activation means and wrist, in proximity with the palm of the hand on which the dispenser housing is worn.

The activation of the dispensing mechanism is configured to release at least one of the dispensable objects contained in the storage chamber through said outlet opening.

The activation means is positioned to allow its pressing by folding at least one of the fingers of the hand on which the dispenser housing is worn, such that upon pressing the activation means, at least one of said dispensable objects is released from the outlet opening toward the palm of the hand on which said dispenser housing is worn.

According to another embodiment of the present invention, the dispenser housing comprising at least one partially enclosed area in connection with the storage chamber and the outlet opening, said at least one partially enclosed area is delimited by movable barrier constituting part of the dispensing mechanism operable by the activation means.

When the activation means is in resting position, the movable barrier allows passage of at least one of the dispensable objects from the storage chamber into said at least one partially enclosed area while blocking passage from said at least one partially enclosed area toward said outlet opening. Pressing the activation means to activate the dispensing mechanism triggers the movable barrier to block passage from the storage chamber toward said at least one partially enclosed area and to allow passage of at least one of the dispensable objects in said at least one partially enclosed area out of the dispenser housing through said outlet opening.

According to another embodiment of the present invention, the dispenser housing comprising a partially enclosed area in connection with said storage chamber and said outlet opening, said partially enclosed area is delimited by a double-barrier constituting part of the dispensing mechanism operable by the activation means, said double-barrier comprising an internal barrier and an external barrier.

When the activation means is in resting position, said internal barrier allows passage of at least one of the dispensable objects from the storage chamber into said partially enclosed area and said external barrier blocks passage from said partially enclosed area toward the outlet opening.

Pressing the activation means to activate the dispensing mechanism triggers said internal barrier to block passage from said storage chamber to said partially enclosed area and said external barrier to allow passage of at least one of the dispensable objects in said partially enclosed area out of said dispenser housing through said outlet opening.

According to another embodiment of the present invention, the dispensing mechanism comprising a circular-multi-barrier disposed between the storage chamber and the outlet opening, said circular-multi-barrier defines a plurality of partially enclosed areas around a rotation axis perpendicular to said outlet opening.

When the activation means is in resting position, one of said plurality of partially enclosed areas being a receiving partially enclosed area is facing the storage chamber to allow passage of at least one of the dispensable objects into said receiving partially enclosed area without allowing passage from said receiving partially enclosed area toward the outlet opening, while another of said plurality enclosed areas being a releasing partially enclosed area is facing the outlet opening to allow passage from said releasing partially enclosed area out of the dispenser housing through the outlet opening.

Pressing the activation means to activate the dispensing mechanism triggers rotation of said circular-multi-barrier around said rotation axis causing (a) one of said partially enclosed areas containing at least one of the dispensable objects and positioned adjacent to said releasing partially enclosed area to rotate into position of said releasing partially enclosed area, such that said at least one of the dispensable objects contained therein is released out of the dispenser housing through the outlet opening, and (b) another of said partially enclosed areas positioned adjacent to said receiving partially enclosed area to rotate into position of said receiving partially enclosed area, allowing at least one of the dispensable objects in the storage container to enter thereinto.

According to another embodiment of the present invention, the activation means is an activation handle. The activation handle is preferably positioned along a line extending from the distal end of the dispenser housing in an angle allowing its pressing by folding of one or more the fingers of the hand on which the dispenser housing is worn.

In accordance with another embodiment of the present invention based on previous embodiments, an internal opening is disposed between the storage chamber and partially enclosed area, said internal opening having a fixed width. The width of the internal opening limits the size of dispensable objects that can be dispensed by the device.

According to another embodiment of the present invention based on previous embodiment, an aperture adjuster is movably installed adjacent to said internal opening, said aperture adjuster is movable and fixable in various positions within a range of movement allowing to partially cover said internal opening to set its width, thereby limiting the size of dispensable objects that can pass through said internal opening. The position of said aperture adjuster is controlled by an adjustment means operatively coupled to said aperture adjustment and being accessible from external side of said dispenser housing. The adjustment means can be a slider, a revolving knob or any other means known in the prior art that allows controlling and fixing the position of the aperture adjuster in various positions within a range of movement.

According to another embodiment of the present invention based on previous embodiment, said aperture adjuster allows setting the width of said internal opening within any range between 5 mm and 40 mm. This range can fit a variety of small objects in different sizes, such that for relatively larger objects the aperture adjuster can be positioned to set a relatively wide internal opening, whereas for relatively smaller objects the aperture adjuster can be positioned to set a relatively narrow internal opening.

In accordance with another embodiment of the present invention, two or more dispensing devices are installed in parallel to one another within a multi dispenser housing, such that two or more activation means are extending from said multi dispenser housing toward the fingers of the hand on which said multi dispenser housing is worn and two or more outlet openings are disposed each in proximity with its corresponding activation means. Pressing each activation means activates its corresponding dispensing mechanism to release dispensable objects contained in its corresponding storage container through its corresponding outlet opening. Preferably, each activation means is positioned in proximity with another finger, such that each of the multiple activation means can be pressed by a different finger.

This embodiment allows instant access to two or more types of dispensable objects, each contained in a different storage chamber, having its corresponding set of inlet opening, activation means, dispensing mechanism and outlet opening, all dispensing sets are laid out in parallel within a unified multi dispenser housing.

In accordance with another embodiment of the present invention, the activation handle in its resting position is positioned in an angle between 0 and 60 degrees relative to the plane on which said dispenser housing is resting when fixed around the wrist. The angle in which the activation handle is positioned is intended to allow the fingers of the hand on which the device is worn to comfortably reach the activation handle and fully press it without requiring any excessive effort or tension on muscles, joints or ligaments.

In accordance with another embodiment of the present invention, the activation handle is formed by two or more parts, a proximal part operatively coupled to the dispensing mechanism and one or more distal parts connected serially to the proximal part. The one or more distal parts are contractible and expandable to allow setting said activation handle in two positions: an open position wherein said one or more distal parts are expanded to form an extension of said proximal part, thereby allowing said activation handle to be pressed by folding of the fingers of the hand on which the device is worn, and a closed position wherein said one or more distal parts are contracted towards said proximal part. The closed position is preferably configured to prevent the activation handle from interrupting the movement of fingers and hand on which the device is worn in order to allow the person wearing the device to conveniently perform other actions in between activations of the device.

The parts of the activation handle may be connected to one another via a rotation joint, such that contraction and expansion of the activation handle is performed by folding and unfolding of the one or more distal parts of the activation handle. Alternatively, the parts of the activation handle may be connected to one another in a telescopic or other arrangement that allows the parts to retract or slide into one another when the activation handle is contracted and extend or slide away from one another when the activation handle is contracted. Contraction and expansion of the activation handle may be enabled by any other contraction and expansion mechanism known in the prior art.

In accordance with another embodiment of the present invention, the activation handle is configured to expand into open position when the device is tilted such that outlet opening is facing downwards, and to contract into closed position when the device is tilted such that said outlet opening is facing upwards. This mechanism utilizes gravity as the force causing contraction and expansion of the activation handle. Since the dispensing mechanism relies on gravity to allow dispensable parts to fall through the outlet opening into the hand when the device activation handle is pressed, the device needs to be tilted to have the outlet opening facing in a general downward direction in order to allow dispensable objects to fall through the outlet opening. This position coincides with the expansion mechanism of the activation handle as disclosed in this embodiment, since stretching of the arm to tilt the output opening of device downwards would both put the device in a position that allows dispensable objects to fall through the outlet opening when the device is activated and cause the activation handle to expand into open position, which is required in order to press the activation handle.

Similarly, when the arm wearing the device is raised or folded such that the outlet opening is facing in a general upward direction, gravitational force would cause the activation handle to contract into a closed position. This position coincides with the working posture of the person wearing the device, since that the hand wearing the device is presumed to face upwards when performing other actions which may involve the use of dispensable objects that have been dispensed into the hand by the device. This way, when the hand wearing the device is facing upwards, the activation handle is contracted into closed position, thereby preventing it from interrupting the user wearing it to perform other actions with the hand on which the device is worn. It will be appreciated that the parts of the activation handle need be somewhat loosely connected to one another, or have some space between their interfacing parts, in order to allow them to contract and expand merely by gravitational force.

In accordance with another embodiment of the present invention, the activation handle is configured to expand into open position when the device is rapidly shaken to propel movement of said one or more distal parts in direction of expansion. Additionally, the activation handle may be also configured to contract into closed position when the device is rapidly shaken to propel movement of said one or more distal parts in direction of contraction.

For example, in an embodiment wherein the activation handle is contractible by means of a folding joint that connect the proximal part of the handle to its distal part, the closed position of the activation handle would have the distal part folded over the top plane of the device, opposite to the plane of the device that rests on the forearm when the device is worn. In order to cause the distal part to unfold by rotating away from the top plane of the device, a user wearing the device on their hand need to rapidly shake their forearm. This causes a rapid short movement of the device in the direction of rotation of the distal part immediately followed by an abrupt change in the direction of movement. While during the initial movement of the device in the direction of rotation the distal part moves as one with the device, when the direction of movement of the device is changed, the inertia drives the distal part to continue rotating away from the device until reaching an open position. The opposite action is triggered if the device is rapidly shaken when the activation handle is in open position, causing the distal part to rotate towards the top plane of the device and back into closed position. Preferably, the rotation joint is configured to allow free movement of the distal part of the activation handle along the rotation axis, but to restrict its movement once the distal part completes its rotation and engages into the closed position and open position. This causes the distal part to lock when fully contracted into closed position and fully expanded into open position, being releasable only by applying mild force onto the distal part by touch of the opposing hand or by rapid shake of the hand on which the device is worn. The same concept can be applied mutatis mutandis also on telescopic or other contraction and expansion mechanisms of the activation handle known from the prior art.

In accordance with another embodiment of the present invention, the device disclosed herein further comprising a safety means capable of disabling the operation of said dispensing mechanism, said safety means is accessible from external side of the dispenser housing.

In accordance with yet another embodiment of the present invention, the storage chamber of the device disclosed herein comprising a loading track configured to align dispensable objects having same shape and size in a row for limiting passage of a single dispensable object from said storage chamber each time said dispensing mechanism is engaged by said activation handle.

According to another embodiment, the device of the present invention comprising two or more storage chambers accessible through one or more inlet openings, each of said two or more storage chambers may be filled with different type of dispensable objects. A switching mechanism is disposed within the dispenser housing, between the two or more storage chambers and the dispensing mechanism. The switching mechanism is configured to allow switching between two or more storage chamber selection modes, each of said two or more storage chamber selection modes corresponding to another of said two or more storage chambers. Switching to each of said two or more storage chamber selection modes causes said switching mechanism to allow passage of dispensable objects toward the outlet opening only from the storage chamber corresponding to the selected storage chamber selection mode, while blocking passage of dispensable objects from the remaining of said two or storage chambers.

The switching mechanism is preferably controlled by a storage chamber selection switch installed on the external side of the dispenser housing, to allow the user wearing the device to conveniently switch between different storage chambers each containing different type of dispensable objects in order to determine which type of dispensable objects are to be dispensed upon engaging the activation means to trigger the dispensing mechanism. Preferably, the storage chambers are arranged in parallel, such that each of them is accessible for insertion of dispensable objects from the same area of the dispenser housing and having an exit pathway for the dispensable objects contained therein toward the dispensing mechanism.

The switching mechanism can configured in the form of a panel capable of sliding sideways to block the exit from a different storage chamber in each position, a tiltable panel for diverting dispensable objects from one storage chamber into the dispensing mechanism while blocking the exit from the remaining storage chambers, or any other A/B selection mechanism known from the prior art.

According to another embodiment of the present invention based on any of the previous embodiments, the device disclosed herein is a pet training device, or particularly, dog training device, and said dispensable objects are pet snacks or edible treats, or particularly, dog snacks, edible treats or other type of dog food.

In accordance with another embodiment of the present invention, the pet training device of the previous embodiment further comprising a sound producing element operatively coupled to the activation handle, such that pressing said activation handle triggers said sound producing element to produce a sound. The sound producing element in conjunction with the safety means can be used for conditioning of pets while training, such that when safety means allow operation of the dispensing mechanism, pressing the activation handle produces a sound while releasing a pet snack. On later repetitions, the safety means can be switched to disable operation of the dispensing mechanism, such that pressing the activation handle produces a sound without releasing a pet snack. Such conditioning will ideally lead to the pet undergoing training to ultimately respond only to the sound produced by the sound producing element without a pet snack being released.

In accordance with another embodiment of the present invention, a method of using the pet training device disclosed herein, comprising the steps of: (i) filling said storage chamber with pet snacks, (ii) fixing said dispenser housing around wrist using said strap, (iii) initiating training of a pet, (iv) upon demonstration of satisfactory behavior by said pet, pressing said activation means to trigger release of pet snacks into the hand on which said dispenser housing is worn and (v) feeding said pet with said pet snacks released from said dispenser housing.

According to another embodiment of the present invention based on any of the previous embodiments, the device disclosed herein is adapted for use in medical procedures, such as first-aid, emergency treatment, multi casualty incidents, surgical procedures and other standard medical procedures.

According to another embodiment of the present invention based on any of the previous embodiments, the device disclosed herein is adapted for use in manual work, such as construction work, installation work, maintenance work, repair work, electrical grid works, infrastructure work, high altitude manual work, industrial work, assembly line work, home improvement work, billboard replacement work and other manual tasks requiring access to small objects.

According to another embodiment of the present invention based on any of the previous embodiments, the device disclosed herein is adapted for use in military and paramilitary operations, such as reconnaissance, combat, sabotage, training, navigation and espionage.

BRIEF DESCRIPTION OF THE DRAWINGS

Embodiments and features of the present invention are described herein in conjunction with the following drawings.

DETAILED DESCRIPTION OF PREFERRED EMBODIMENTS

The present invention will be understood from the following detailed description of preferred embodiments, which are meant to be descriptive and not limiting. For the sake of brevity, some well-known features, methods, systems, procedures, components, and so on, are not described in detail. A person skilled in the art will be able to utilize said mechanism or other mechanisms known from prior art to execute the present invention.

Figure 1A:
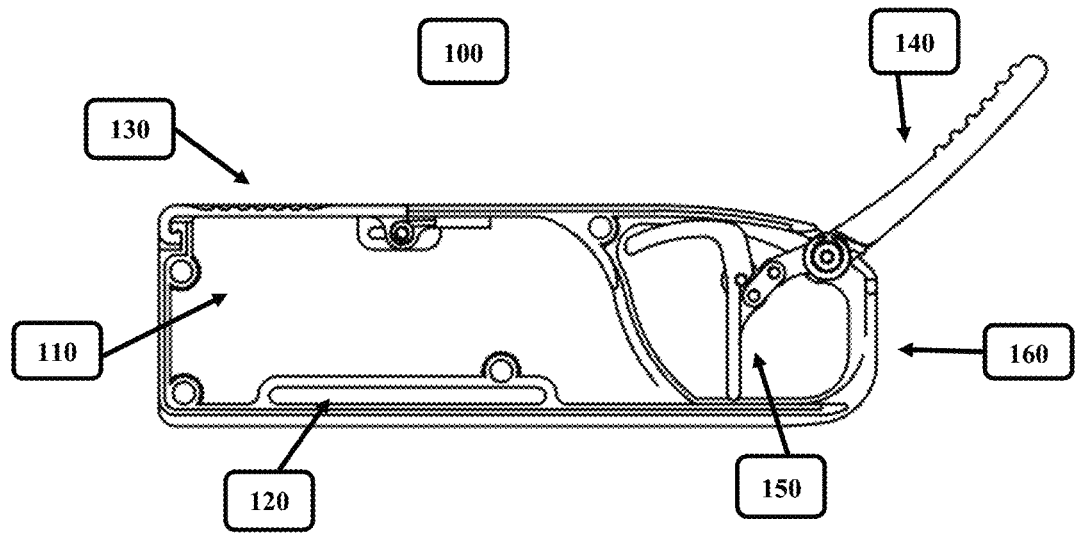
FIG. 1a, FIG. 1b and FIG. 1c depict cross section, top and front views, respectively, of a wrist-wearable dispensing device in accordance with an embodiment of the present invention.
Figure 1B:
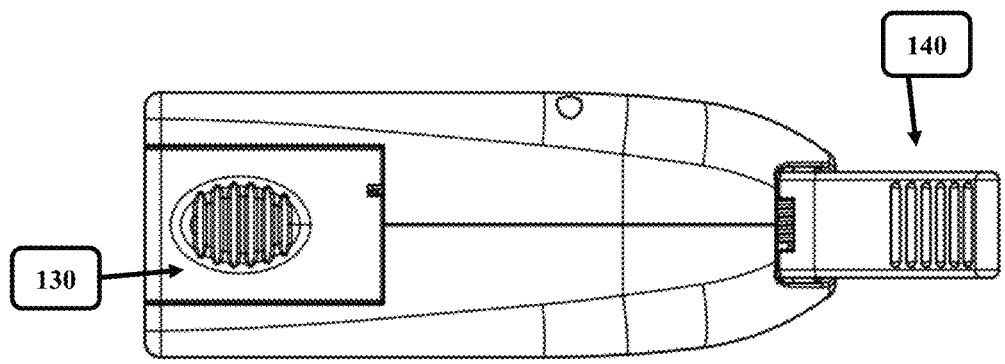
Figure 1C:
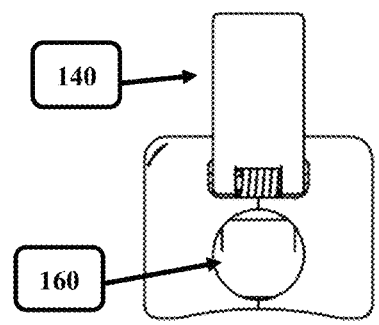

A basic embodiment of the device of the present invention is shown in FIG. 1a, FIG. 1b and FIG. 1c. FIG. 1a depicts a cross section of the device (100), which comprises a storage chamber (110), a slit (120) crossing through the device for insertion of a strap for wearing the device on the wrist or forearm, an inlet opening (130), a dispensing mechanism (150), an activation handle (140) and an outlet opening (160). The storage chamber (110) may be filled with dispensable objects through the inlet opening (130). The inlet opening (130) comprising a cover installed on a hinge allowing the inlet opening to be securely closed after dispensable objects are inserted into the storage chamber. A strap pulled through the slit (120) is fastened around wrist or forearm for fixing the device (100) such that outlet opening (160) is positioned in proximity to the palm of the hand on which the device is worn. The activation handle (140) is operatively coupled to the dispensing mechanism (150). When pressed down, the activation handle (140) causes the dispensing mechanism (150) to release at least one of the dispensable objects from the storage chamber (110) out of the device (100) through the outlet opening (160). The activation handle (140) is positioned in an angle allowing its pressing by folding at least one of the fingers of the hand on which the device (100) is worn, such that upon pressing the activation handle (140), at least one of the dispensable objects is released from the outlet opening (160) toward the palm of the hand on which said dispenser housing is worn. As shown in FIG. 1b, depicting the device (100) from a top view, the device (100) is intended to have a width not wider than the width of an average forearm in order to allow the device (100) to be conveniently and tightly worn around the forearm or wrist. As shown in FIG. 1c, the bottom side of the device (100) has a concave shape to fit the generally convex shape of the forearm.

Figure 2:
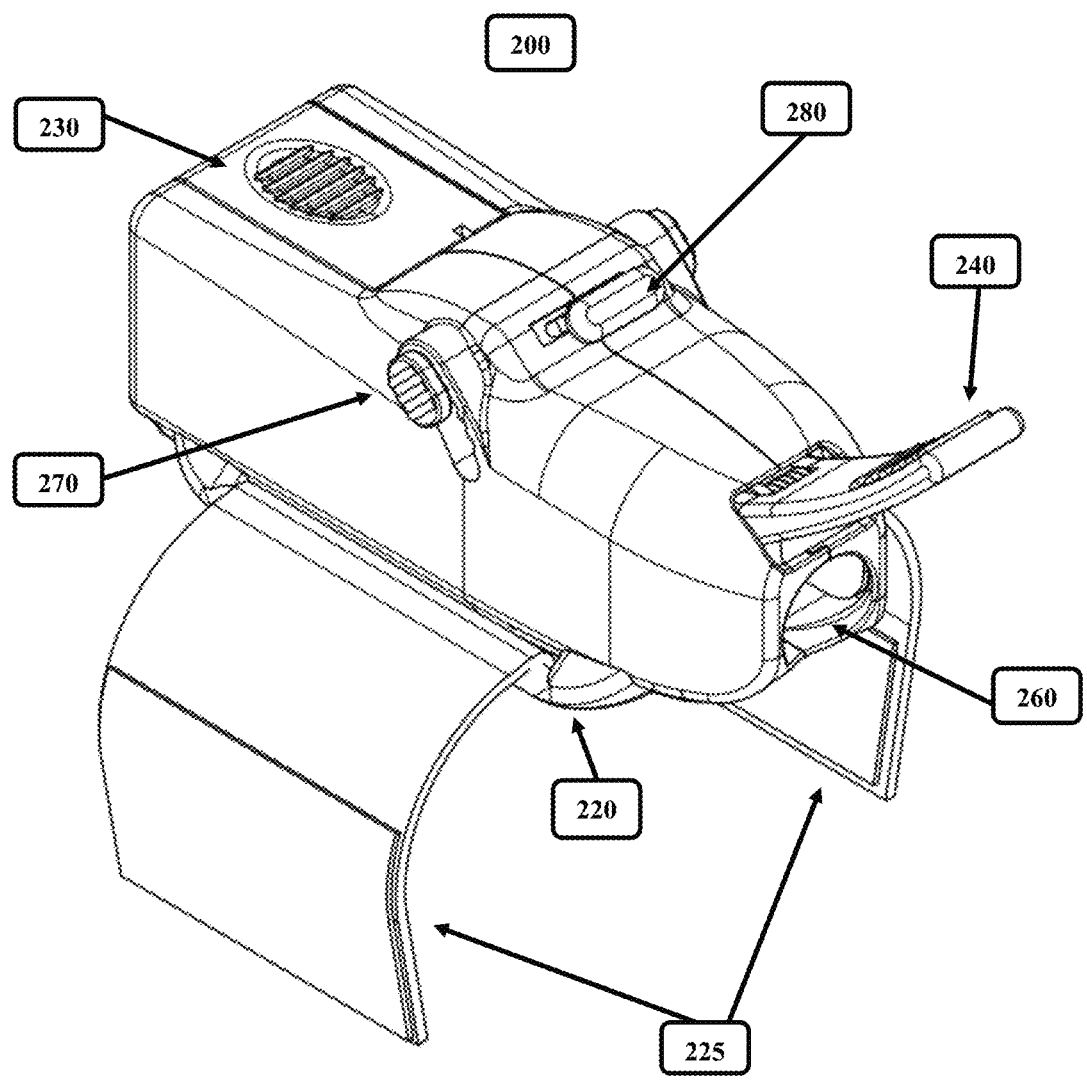
FIG. 2 depicts an isometric view of a wrist-wearable dispensing device comprising a safety switch and an aperture adjuster in accordance with another embodiment of the present invention.

Now referring to FIG. 2, an external isometric view of another preferred embodiment of the device (200) of the present invention is shown therein. The device (200) comprising a securely closable inlet opening (230) for filling the storage chamber (not shown) with dispensable objects. A two-piece Velcro strap (225) is installed on two elongated lugs (220) fixed on both bottom sides of the device (200). The two pieces of the strap (225) can be pulled together and fastened around the wrist by placing the Velcro patches on both pieces one on top of the other. Activation handle (240) extends from the end of the device (200) intended to face the palm of the hand on which it is worn, and operatively coupled to the dispensing mechanism (not shown) disposed within the device (200). When pressing the activation handle (240), the dispensing mechanism is configured to release at least one dispensable object out of the device (200) through the outlet opening (260). The device (200) further comprising a safety switch (280) for disabling and enabling the operation of the dispensing mechanism, and an aperture slider (270) controlling an aperture adjuster (not shown) disposed within the device (200) adjacent to an internal opening (not shown) for setting the width of the internal opening to limit the size or quantity of dispensable objects that can pass from the storage chamber towards the outlet opening (260).

Figure 3A:
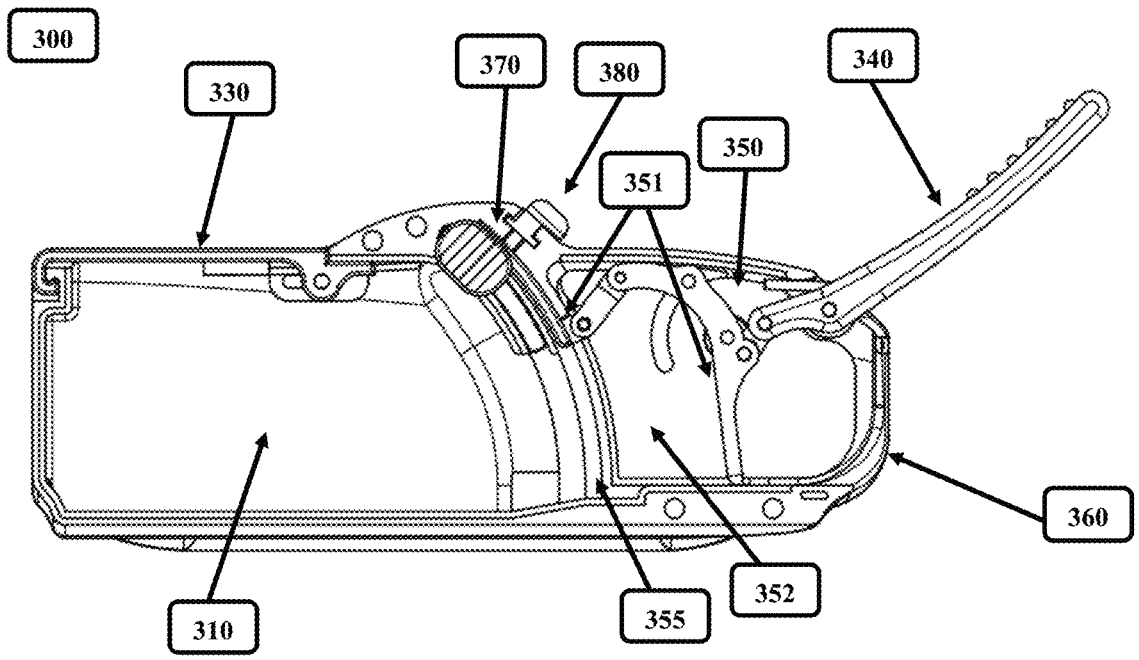
FIG. 3a and FIG. 3b depict a cross section view of a dispending device in accordance with an embodiment of the present invention in a first mode of activation handle being in resting position, and a second mode of activation handle being in engaged position, respectively.
Figure 3B:
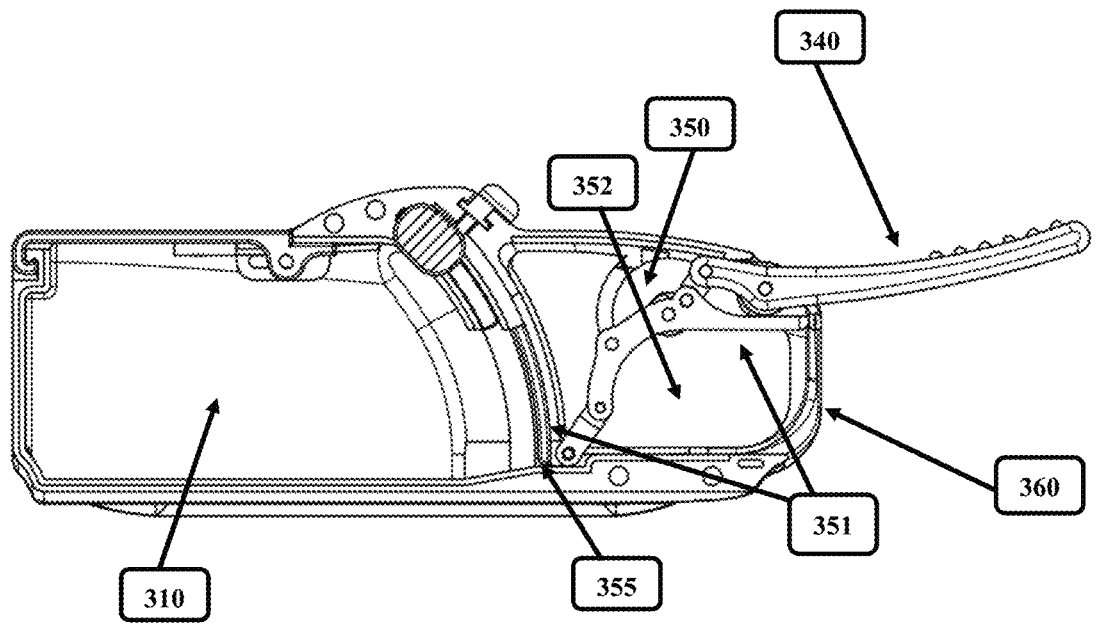

FIG. 3a and FIG. 3b depict a cross section view of a dispending device in accordance with an embodiment of the present invention. FIG. 3a depicts the device (300) when activation handle (340) is in resting position. Dispensable objects can be inserted into storage chamber (310) through a securely closable inlet opening (330). An internal opening (355) is disposed between the storage chamber (310) and dispensing mechanism (350). The device (300) further comprises a safety switch (380) and an aperture adjuster (370) for adjusting the width of the internal opening (355). The dispensing mechanism (350) comprises a multi-barrier (351) having a front barrier in proximity with the outlet opening (360) and a back barrier in proximity with the internal opening (355), both define a partially enclosed area (352) in between. When activation handle (340), being operatively coupled to the dispensing mechanism (350), is in resting position, the front barrier of the multi-barrier (351) blocks passage from the partially enclosed area (352) toward the outlet opening (360), while the back barrier of the multi-barrier (351) allows passage of dispensable objects from the storage chamber (310) into the partially enclosed area (352).

FIG. 3b depicts the device (300) when activation handle (340) is pressed, thereby triggering the dispensing mechanism (350), causing the front barrier of the multi-barrier (351) to open the passage between the partially enclosed area (352) and outlet opening (360) to allow dispensable objects contained in the partially enclosed area (352) to be released out of the device (300) through the outlet opening (360), while causing the back barrier of the multi-barrier (351) to block the internal opening (355), thereby preventing passage of dispensable objects out of the storage chamber (310) to limit the quantity of dispensable objects being dispensed upon each press of the activation handle (340).

Figure 4A:
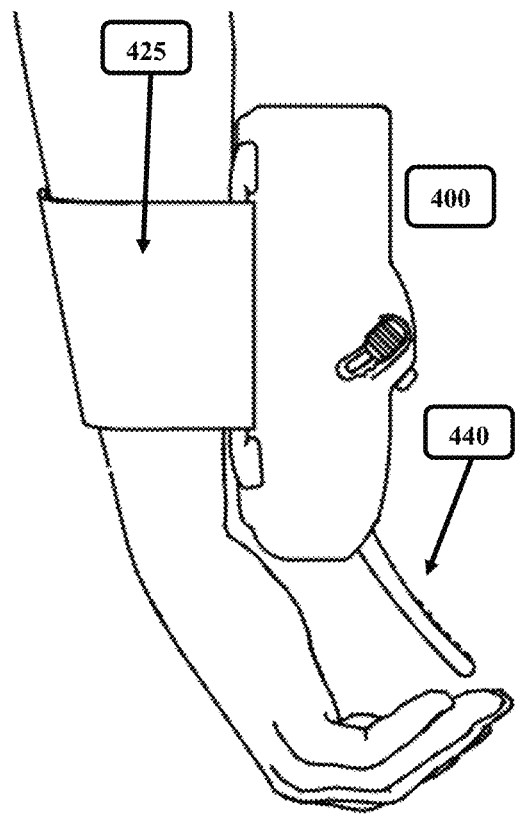
FIG. 4a and FIG. 4b depict a dispensing device worn around a wrist in accordance with an embodiment of the present invention, in a first mode of activation handle being in resting position, and a second mode of activation handle being engaged by the hand on which the device is worn, respectively.
Figure 4B:
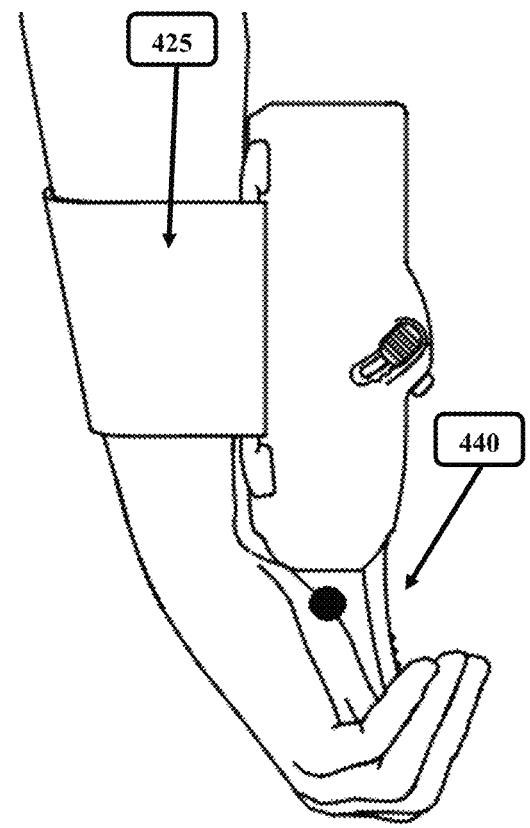

FIG. 4a and FIG. 4b depict a dispensing device (400) in accordance with an embodiment of the present invention fixed on a forearm using a strap (425) such that the device (400) is positioned along the palm side of the forearm and wrist, with its activation handle (400) facing the palm of the hand on which the device (400) is worn. In FIG. 4a, the activation handle (440) is resting position, extending from the device (400) in an angle allowing its pressing by folding at least one of the fingers of the hand on which the device (400) is worn. In FIG. 4b, the fingers of the hand on which the device (400) is worn are folded to press the activation handle (440), which triggers the dispensing mechanism (not shown) to release at least one dispensable objects out of the device (400) and into the palm of the hand on which it is worn.

Figure 5A:
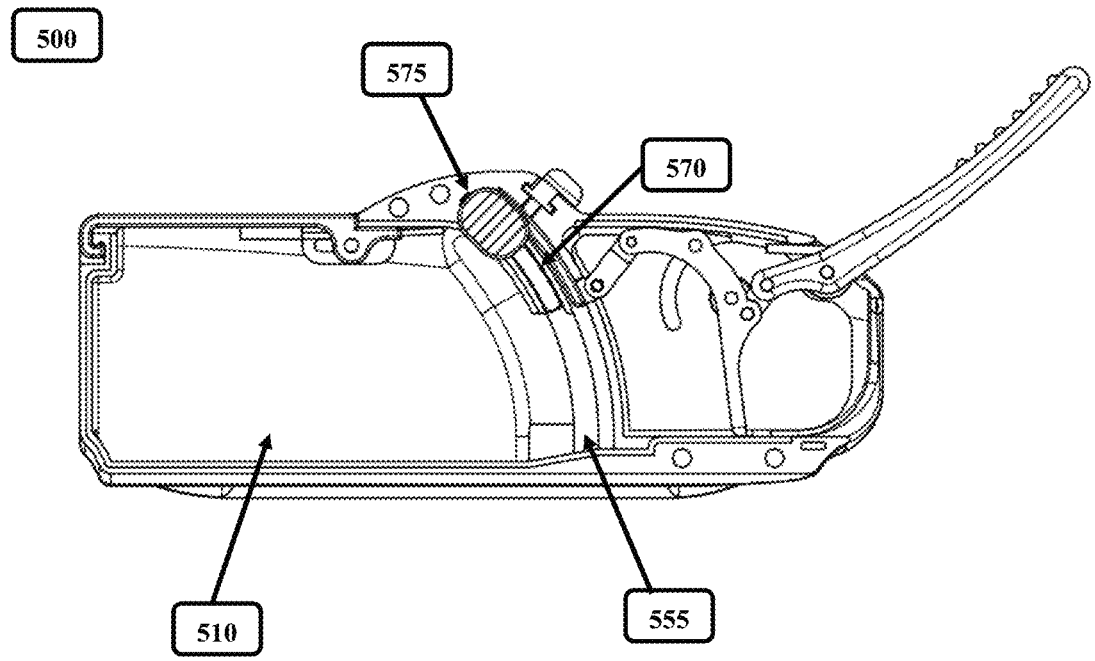
FIG. 5a and FIG. 5b depict a cross section view of a dispending device in accordance with an embodiment of the present invention in a first mode of aperture adjuster being set on wide internal opening, and a second mode of aperture adjuster being set on narrow internal opening, respectively.
Figure 5B:
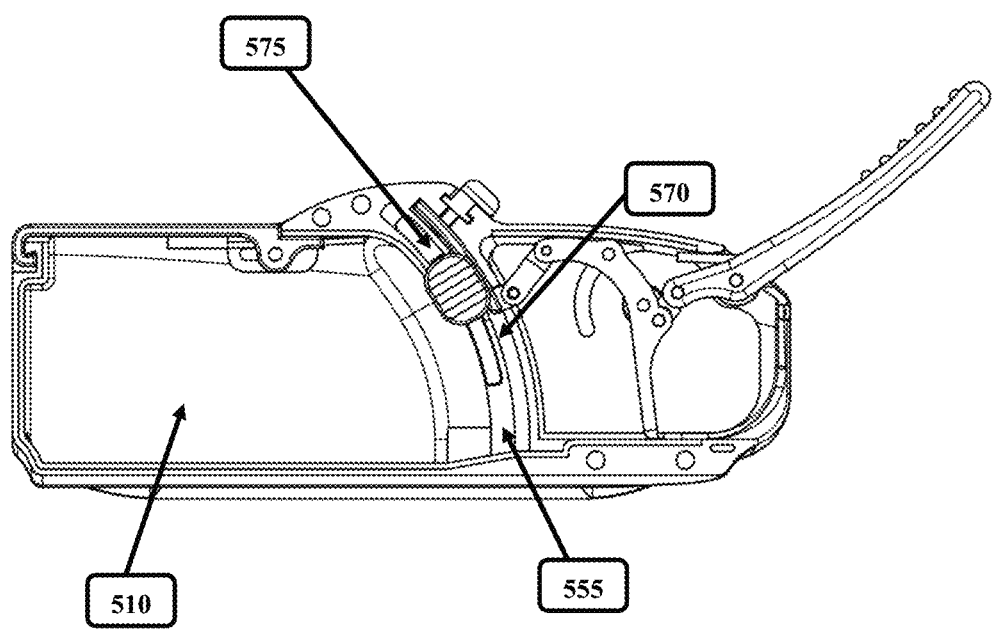

Now referring to FIG. FIG. 5a and FIG. 5b, a cross section view of a dispending device (500) in accordance with an embodiment of the present invention is shown therein. An aperture adjuster (570) is movably installed within the device (500) adjacent to the internal opening (555). The aperture adjuster (570) is movable and fixable in various positions within a range of movement affecting the width of the internal opening (555), thereby limiting the size or quantity of dispensable objects that can pass through said internal opening. The aperture adjuster (570) is operatively coupled to an adjustment slider (575) installed on the external side of device (500), to provide easy access for setting the width of the internal opening (555). In FIG. 5a, the adjustment slider (575) is pulled fully upwards positioning the aperture adjuster (570) distant from opposing wall of the internal opening (555) thereby setting a wide aperture of the internal opening (555) that allows larger or more dispensable objects to pass from the storage chamber (510) through the internal opening (555). In FIG. 5b, the adjustment slider (575) is pulled fully downwards positioning the aperture adjuster (570) closer to the opposing wall of the internal opening (555) thereby setting a narrow aperture of the internal opening (555) that limits passage from the storage chamber (510) through the internal opening (555) to smaller or fewer dispensable objects.

Figure 6A:
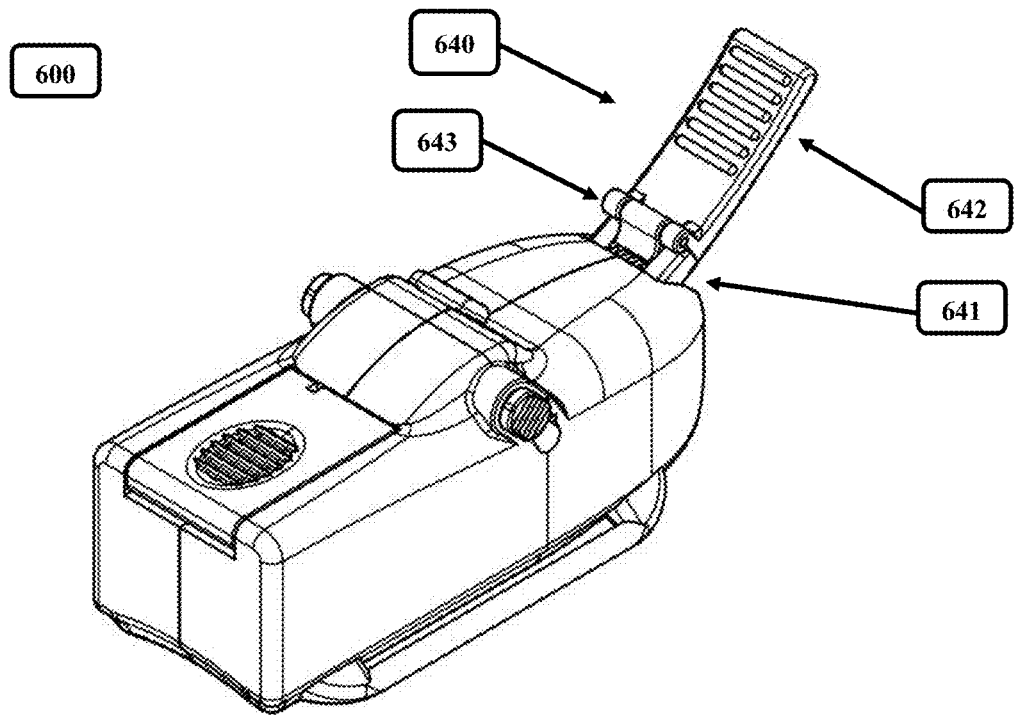
FIG. 6a and FIG. 6b depict an isometric view of a wrist-wearable dispensing device in accordance with yet another embodiment of the present invention comprising a foldable activation handle in a first mode being an open position, and a second mode being a closed position, respectively.
Figure 6B:
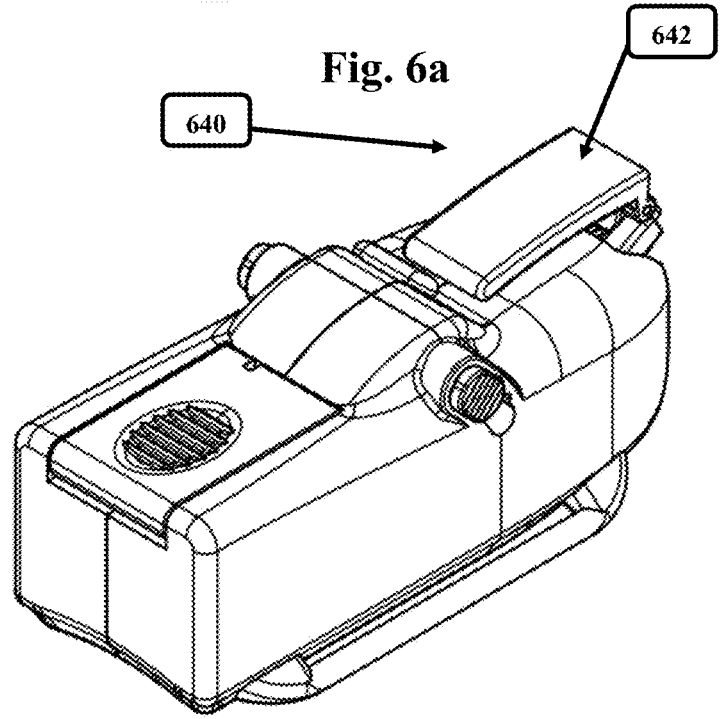

FIG. 6a and FIG. 6b depict an isometric view of a dispensing device (600) in accordance with another embodiment of the present invention comprising a foldable activation handle (641) formed by two parts, a proximal part (641) operatively coupled to the dispensing mechanism (not shown) and a distal part (642) connected via a rotatable joint (643) to said proximal part. In FIG. 6a, the activation handle (640) is in an open position, wherein the distal part (642) is rotated to a position in which it becomes a direct extension of the proximal part (641) allowing the activation handle (640) to trigger the dispensing mechanism (not shown) when pressed. In FIG. 6b, the activation handle (640) is in a closed position, wherein the distal part (642) is folded on top of the plane of the device (600) opposite to the plane which is in contact with the wrist upon which the device is fixed.

Figure 7A:
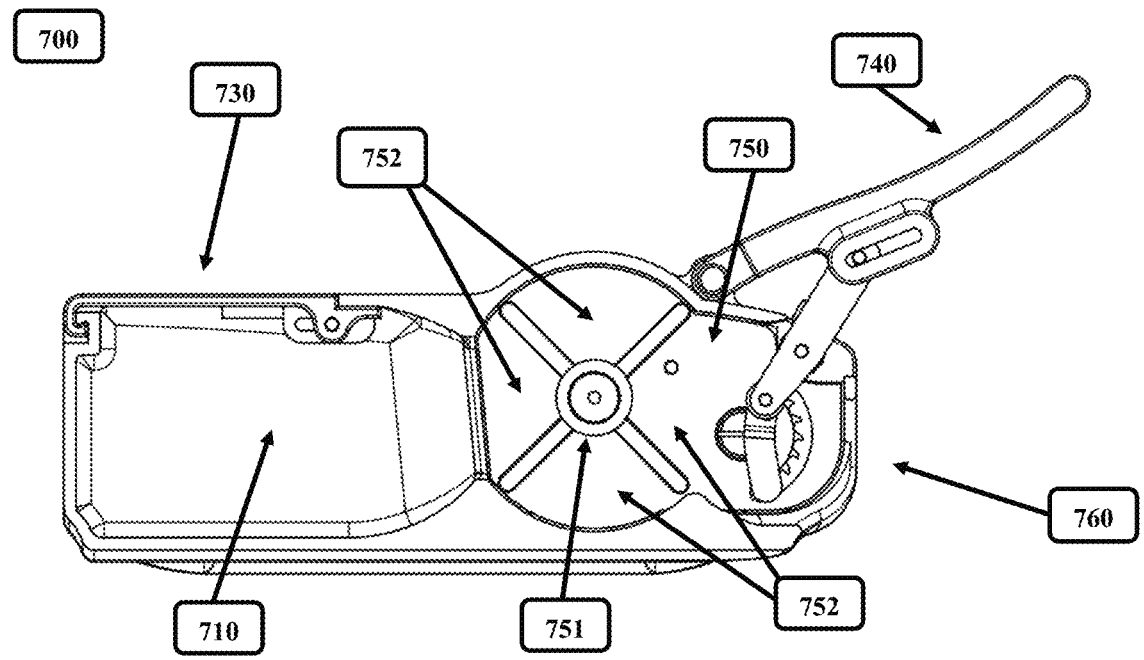
FIG. 7a and FIG. 7b depict a cross section view of a dispending device in accordance with another embodiment of the present invention comprising a dispensing mechanism with a cross-shaped circular-multi-barrier in a first mode of activation handle being in resting position, and a second mode of activation handle being in engaged position, respectively.
Figure 7B:
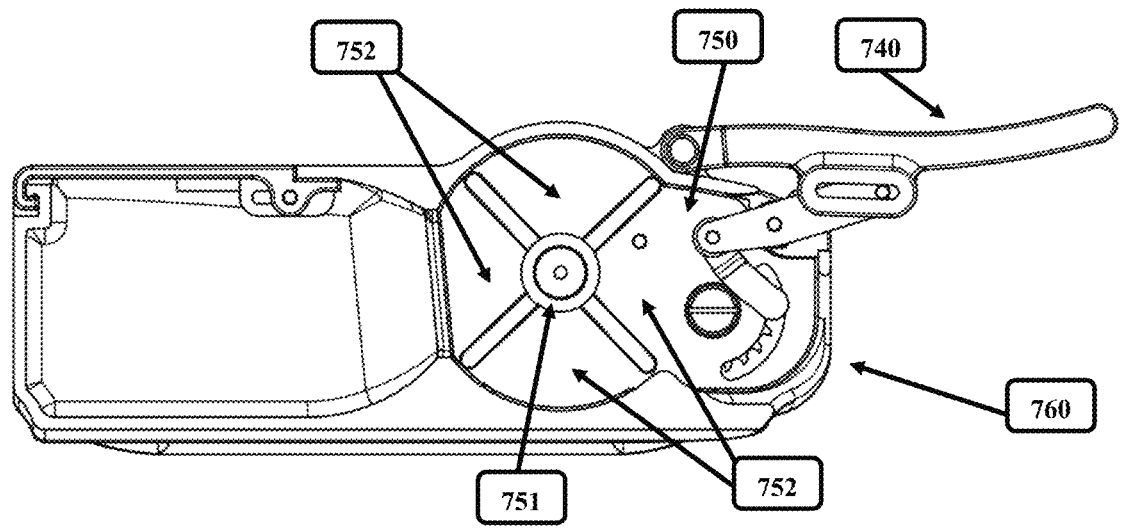

FIG. 7a and FIG. 7b depict a cross section view of a dispending device (700) in accordance with another embodiment of the present invention comprising a dispensing mechanism (750) with a cross-shaped circular-multi-barrier (751) having four barriers defining four partially enclosed areas (752) between each two adjacent barriers. The circular-multi-barrier (751) is rotatable around a rotation axis perpendicular to the outlet opening (760). The dispensing mechanism (750) further comprising a gear mechanism (not shown) that facilitates activation of the dispensing mechanism (750) by pressing the activation handle (740). A securely closable inlet opening (730) is used for inserting dispensable objects into the storage chamber (710).

In FIG. 7a, one of the plurality of partially enclosed areas (752) being a receiving partially enclosed area is facing the storage chamber to allow passage of at least one of the dispensable objects into said receiving partially enclosed area without allowing passage from said receiving partially enclosed area toward the outlet opening (760), while another of said plurality enclosed areas (752) being a releasing partially enclosed area is facing the outlet opening (760) to allow passage from said releasing partially enclosed area out of the dispenser housing (700) through the outlet opening (760).

In FIG. 7b, the activation handle (740) is pressed, thereby engaging the dispensing mechanism (750) to trigger a 90 degrees rotation of the circular-multi-barrier (751) around its rotation axis causing one of the partially enclosed areas (752) containing at least one of the dispensable objects and positioned adjacent to said releasing partially enclosed area to rotate into position of said releasing partially enclosed area, such that said at least one of the dispensable objects contained therein is released out of the device (700) through the outlet opening (760), and while causing another of the partially enclosed areas (752) positioned adjacent to said receiving partially enclosed area to rotate into position of said receiving partially enclosed area, allowing at least one of the dispensable objects in the storage container (710) to enter thereinto.

Figure 8A:
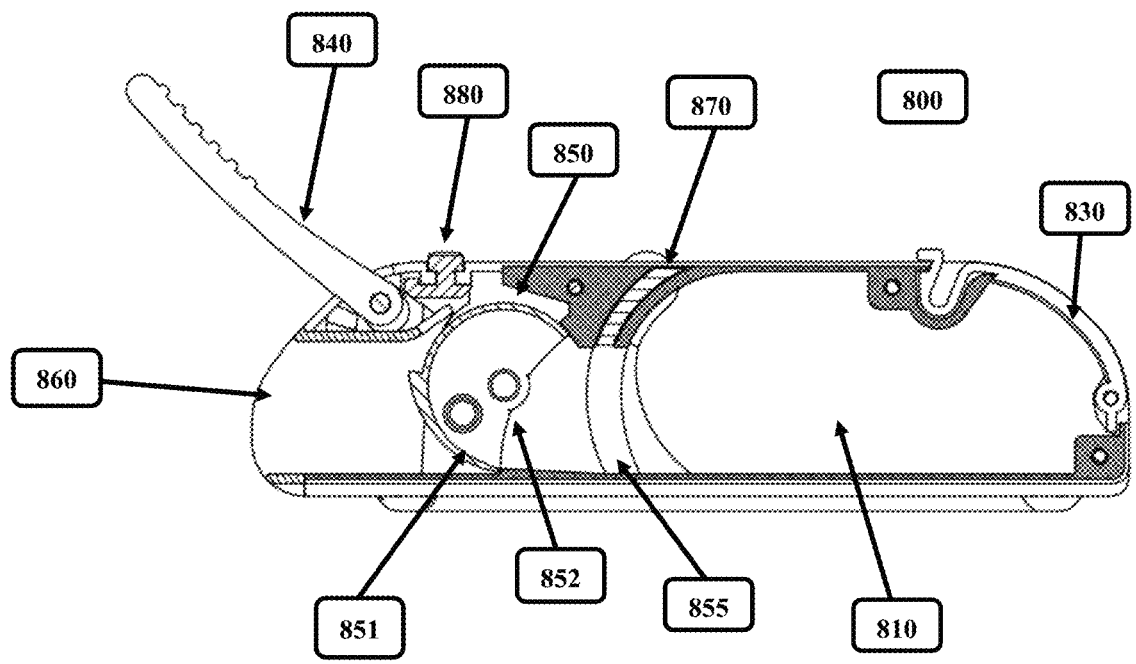
FIG. 8a and FIG. 8b depict a cross section view of a dispending device in accordance with yet another embodiment of the present invention in a first mode of activation handle being in resting position, and a second mode of activation handle being in engaged position, respectively.
Figure 8B:
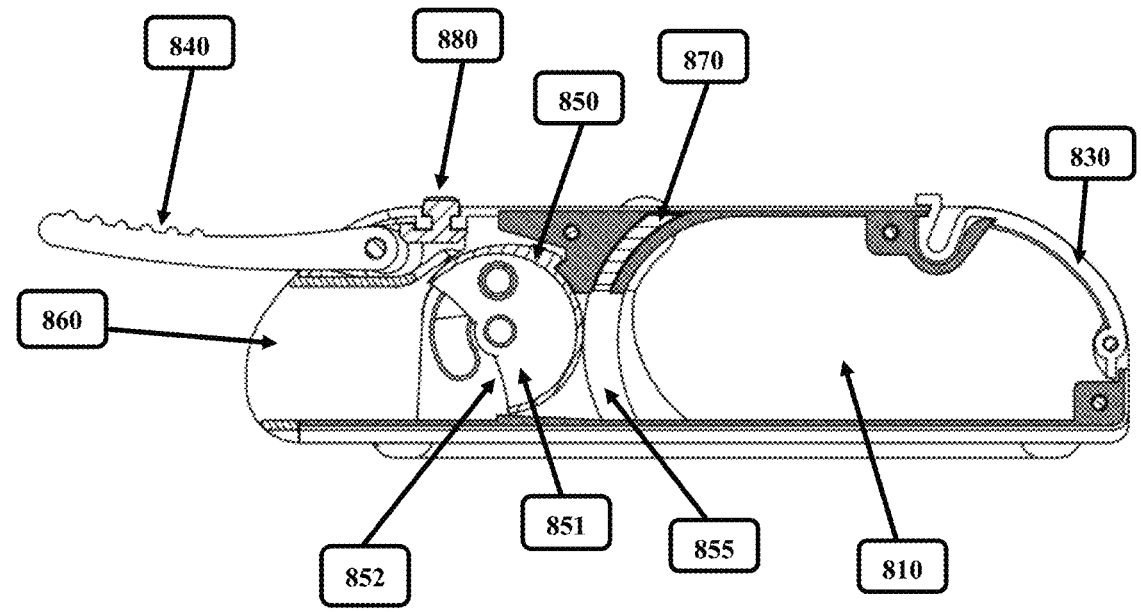

FIG. 8a and FIG. 8b depict a cross section view of a dispending device in accordance with yet another embodiment of the present invention. FIG. 8a depicts the device (800) when activation handle (840) is in resting position. Dispensable objects can be inserted into storage chamber (810) through a securely closable inlet opening (830). An internal opening (855) is disposed between the storage chamber (810) and dispensing mechanism (850). The device (800) further comprises a safety switch (880) and an aperture adjuster (870) for adjusting the width of the internal opening (855). The dispensing mechanism (850) comprises a movable barrier (851) configured as a cylindrical container horizontally and rotatably installed between internal lateral walls of the device along an axis perpendicular to the plane extending from the storage chamber (810) to the outlet opening (860). The movable barrier (851) having a longitudinal aperture allowing passage of dispensable items into the movable barrier, defining a partially enclosed area (852) between the outlet opening (860) and storage chamber (810). The activation handle (840) is operatively coupled to the dispensing mechanism (850, partially shown), such that pressing it triggers the dispensing mechanism (850) to cause rotation of the movable barrier (851). When the activation handle (840) is in resting position, the longitudinal aperture in the movable barrier (851) is facing the storage chamber (810), allowing passage of dispensable objects from the storage chamber (810) into the partially enclosed area (852), while the opposing part of the movable barrier (851) is facing the outlet opening (860), blocking passage of dispensable items from the storage chamber (810) towards the outlet opening (860).

FIG. 8b depicts the device (800) when activation handle (840) is pressed, triggering the dispensing mechanism (850, partially shown) to cause the movable barrier (851) to rotate around an axis perpendicular to the plane extending from the storage chamber (810) to the outlet opening (860), such that the longitudinal aperture of the movable barrier (851) is rotated to face the outlet opening (860), thereby opening the passage between the partially enclosed area (852) and outlet opening (860) to allow dispensable objects contained in the partially enclosed area (852) to be released out of the device (800) through the outlet opening (860), while causing the opposing end of the movable barrier (851) to block the internal opening (855), thereby preventing passage of dispensable objects out of the storage chamber (810) to limit the quantity of dispensable objects being dispensed upon each press of the activation handle (840).

Figure 9A:
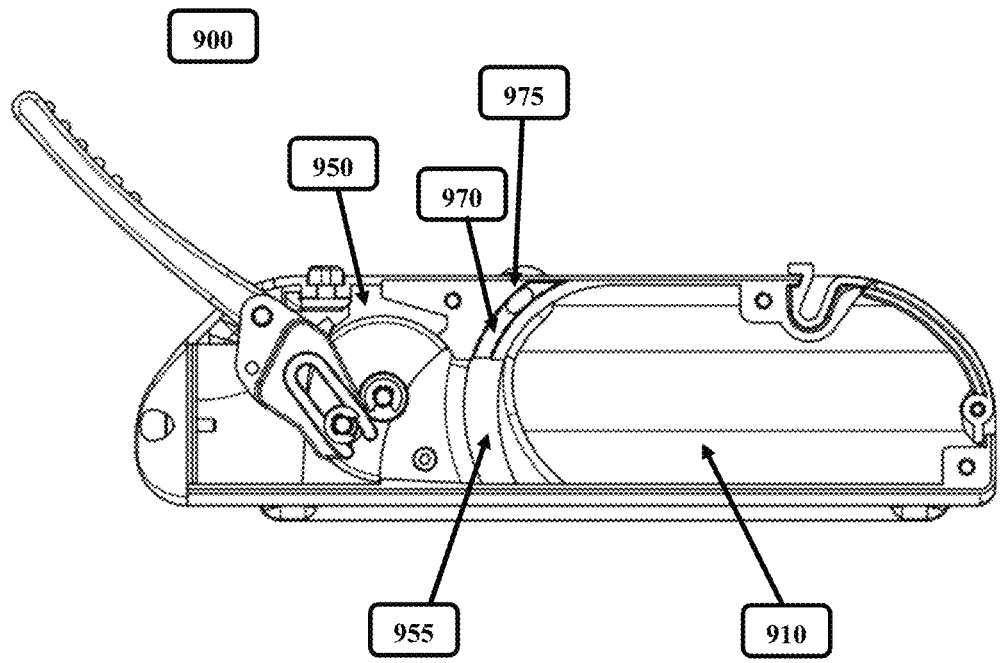
FIG. 9a and FIG. 9b depict a cross section view of a dispending device in accordance with yet another embodiment of the present invention in a first mode of aperture adjuster being set on wide internal opening, and a second mode of aperture adjuster being set on narrow internal opening, respectively.
Figure 9B:
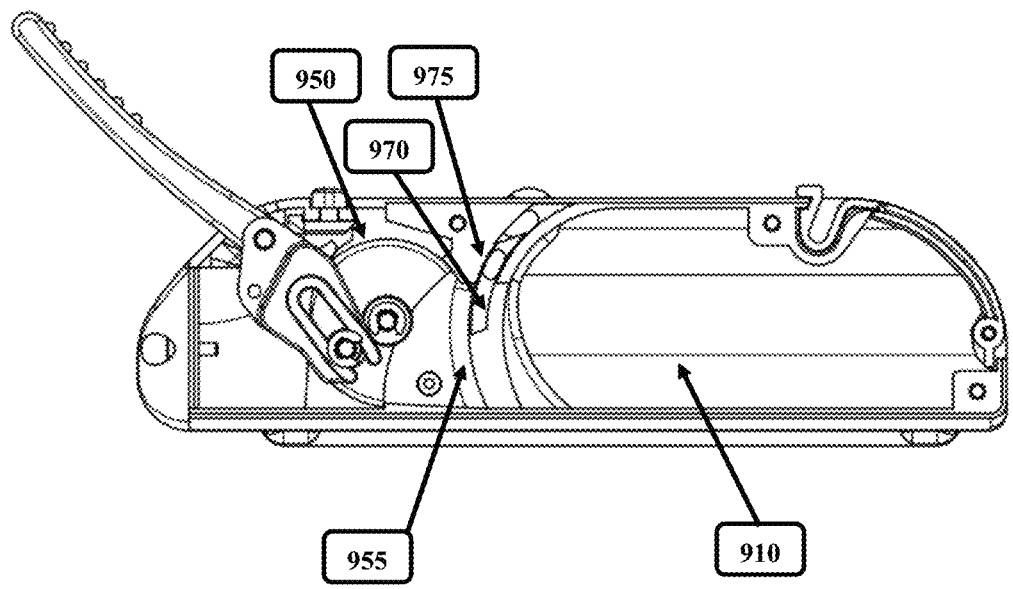

Now referring to FIG. FIG. 9a and FIG. 9b, a cross section view of a dispending device (900) in accordance with another embodiment of the present invention is shown therein. An aperture adjuster (970) is movably installed within the device (900) adjacent to the internal opening (955). The aperture adjuster (970) is movable and fixable in various positions within a range of movement affecting the width of the internal opening (955), thereby limiting the size or quantity of dispensable objects that can pass through said internal opening. The aperture adjuster (970) is operatively coupled to an adjustment slider (975) installed on the external side of device (900), to provide easy access for setting the width of the internal opening (855). In this embodiment, the In FIG. 9a, the adjustment slider (975) is pulled fully upwards positioning the aperture adjuster (970) distant from opposing wall of the internal opening (955) thereby setting a wide aperture of the internal opening (955) that allows larger or more dispensable objects to pass from the storage chamber (910) through the internal opening (955). In FIG. 9b, the adjustment slider (975) is pulled fully downwards positioning the aperture adjuster (970) closer to the opposing wall of the internal opening (955) thereby setting a narrow aperture of the internal opening (955) that limits passage from the storage chamber (910) through the internal opening (955) to smaller or fewer dispensable objects.

Figure 10:
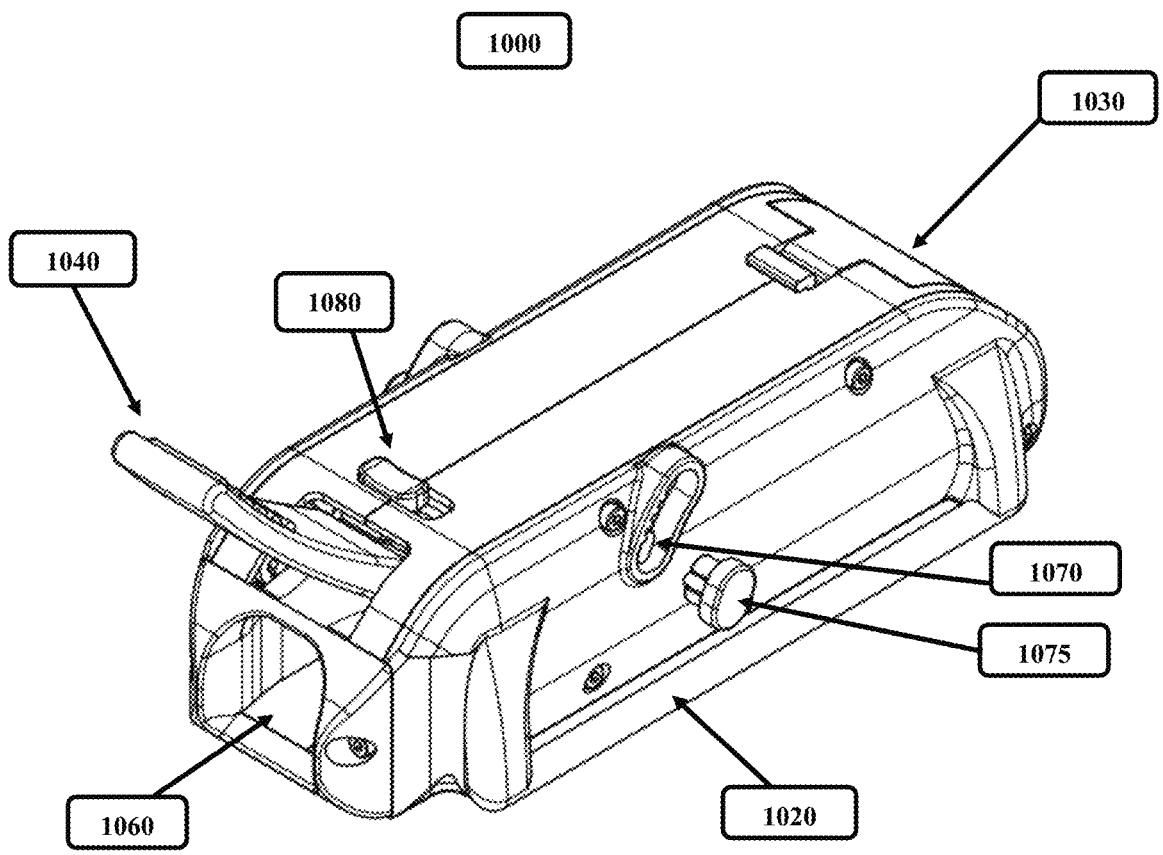
FIG. 10 depicts an isometric view of a wrist-wearable dispensing device in accordance with yet another embodiment of the present invention.

Now referring to FIG. 10, an external isometric view of another preferred embodiment of the device (1000) of the present invention is shown therein. The device (1000) comprising a securely closable inlet opening (1030) for filling the storage chamber (not shown) with dispensable objects. Two elongated lugs (1020) are fixed on both bottom sides of the device (1000) to allow insertion of a strap for securing the device around the wrist. Activation handle (1040) extends from the end of the device (1000) intended to face the palm of the hand on which it is worn, and operatively coupled to the dispensing mechanism (not shown) disposed within the device (1000). When pressing the activation handle (1040), the dispensing mechanism is configured to release at least one dispensable object out of the device (1000) through the outlet opening (1060). The device (1000) further comprising a safety switch (1080) for disabling and enabling the operation of the dispensing mechanism, and an aperture slider (1075) can be installed on aperture adjuster (1070, partially shown) disposed within the device (1000) adjacent to an internal opening (not shown) for setting the width of the internal opening to limit the size or quantity of dispensable objects that can pass from the storage chamber towards the outlet opening (1060).

Figure 11:
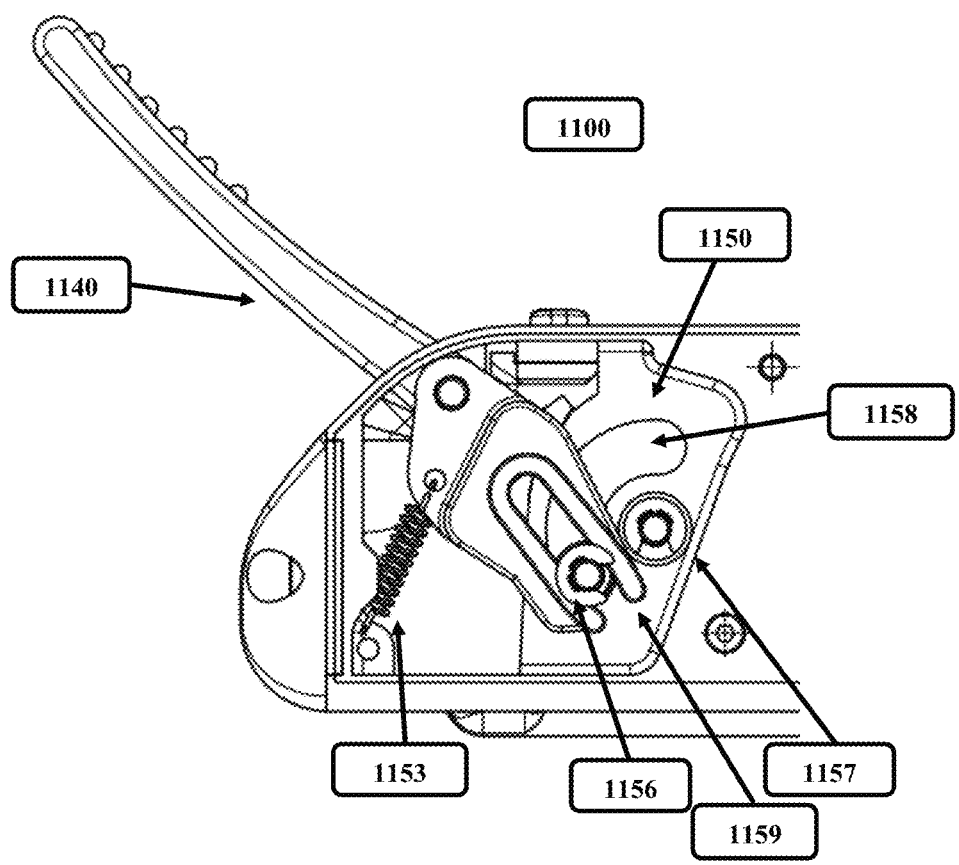
FIG. 11 illustrates a close up cross section view of the device shown in FIGS. 8-10.

FIG. 11 illustrates a close up cross section view of the device (1100) in accordance with the embodiment of the present invention shown in FIGS. 8-10. This view is intended to complement the understanding the structure of the dispensing mechanism (1150). The dispensing mechanism (1150) comprises a movable barrier (not shown) rotatably installed on a pair of rotation pins (1157, only one shown) fixed on two opposing internal lateral walls of the device (1100), a pair of tension springs (1153, only one shown) installed between internal part of the activation handle (1140) and internal frontal wall of the device (1100), rotation tracks (1158, only one shown) fixed on two opposing internal lateral walls of the device (1100), and a pair of gripping pins (1157, only one shown) protruding from lateral walls of the movable barrier and movably gripped by a pair of forks (1159, only one shown) extending from the internal part of the activation handle (1140). Upon pressing the handle (1140), the forks (1159) move the gripping pins (1156) through the rotation tracks (1158) and around the axis of the rotation pins (1157), thereby causing rotation of the movable barrier. When the activation handle (1140) is released, the tension springs (1153) contract back to their natural position, thereby causing the activation handle (1140) to return to its resting position and movable barrier to rotate back to its previous position.

The foregoing description and illustrations of the embodiments of the invention has been presented for the purposes of illustration. They are not intended to be exhaustive or to limit the invention to the above description in any form.

Any term that has been defined above and used in the claims, should be interpreted per this definition.

The invention claimed is:

1. A wrist worn dispensing device, comprising:
   i. a dispenser housing;
   ii. a strap for fixing said dispenser housing around wrist or forearm;
   iii. a storage chamber within dispenser housing for containing dispensable objects;
   iv. an inlet opening in said dispenser housing in connection with said storage chamber for filling said storage chamber with dispensable objects;
   v. an outlet opening in said dispenser housing for release of dispensable objects contained in said storage chamber;
   vi. a dispensing mechanism disposed within dispenser housing;
   vii. an activation means extending from said dispenser housing in proximity with said outlet opening;
   wherein said activation means is operatively coupled to said dispensing mechanism and configured to activate said dispensing mechanism upon being pressed;
   wherein when said dispenser housing is fixed on palm side of the wrist, said activation means extends from said dispenser housing towards the fingers of the hand on which said dispenser housing is worn, and said outlet opening is positioned between said activation means and wrist, in proximity with the palm of the hand on which said dispenser housing is worn;
   wherein activation of said dispensing mechanism is configured to release at least one of said dispensable objects contained in said storage chamber through said outlet opening; and
   wherein said activation means is positioned to allow its pressing by folding at least one of the fingers of the hand on which said dispenser housing is worn, such that upon pressing said activation means, at least one of said dispensable objects is released from said outlet opening toward the palm of the hand on which said dispenser housing is worn.

2. The device of claim 1, wherein said dispenser housing comprising a partially enclosed area in connection with said storage chamber and said outlet opening, said partially enclosed area is defined by a double-barrier constituting part of said dispensing mechanism operable by said activation means, said double-barrier comprising an internal barrier and an external barrier;
   wherein when said activation means is in resting position, said internal barrier allows passage of at least one of said dispensable objects from said storage chamber into said partially enclosed area and said external barrier blocks passage from said partially enclosed area toward said outlet opening; and
   wherein pressing said activation means to activate said dispensing mechanism triggers said internal barrier to block passage from said storage chamber to said partially enclosed area and said external barrier to allow passage of at least one of said dispensable objects in said partially enclosed area out of said dispenser housing through said outlet opening.

3. The device of claim 1, wherein said dispensing mechanism comprising a circular-multi-barrier disposed between said storage chamber and said outlet opening, said circular-multi-barrier defines a plurality of partially enclosed areas around a rotation axis perpendicular to said outlet opening;
   wherein when said activation means is in resting position, one of said plurality of partially enclosed areas being a receiving partially enclosed area is facing said storage chamber to allow passage of at least one of said dispensable objects into said receiving partially enclosed area without allowing passage from said receiving partially enclosed area toward said outlet opening, while another of said plurality enclosed areas being a releasing partially enclosed area is facing said outlet opening to allow passage from said releasing partially enclosed area out of said dispenser housing through said outlet opening;
   wherein pressing said activation means to activate said dispensing mechanism triggers rotation of said circular-multi-barrier around said rotation axis causing (a) one of said partially enclosed areas containing at least one of said dispensable objects and positioned adjacent to said releasing partially enclosed area to rotate into position of said releasing partially enclosed area, such that said at least one of said dispensable objects contained therein is released out of said dispenser housing through said outlet opening, and (b) another of said partially enclosed areas positioned adjacent to said receiving partially enclosed area to rotate into position of said receiving partially enclosed area, allowing at least one of said dispensable objects in said storage container to enter thereinto.

4. The device of claim 1, wherein two or more dispensing devices are installed in parallel to one another within a multi dispenser housing, such that two or more activation means are extending from said multi dispenser housing toward the fingers of the hand on which said multi dispenser housing is worn and two or more outlet openings are disposed each in proximity with its corresponding activation means; and wherein pressing each activation means activates its corresponding dispensing mechanism to release dispensable objects contained in its corresponding storage container through its corresponding outlet opening.

5. The device of claim 1, further comprising a safety means capable of disabling the operation of said dispensing mechanism, said safety means is accessible from external side of the dispenser housing.

6. The device of claim 1, wherein said storage chamber comprising a loading track configured to align dispensable objects having same shape and size in a row for limiting passage of a single dispensable object from said storage chamber each time said dispensing mechanism is engaged by said activation handle.

7. The device of claim 1, wherein the device comprising two or more storage chambers accessible through one or more inlet openings; and
    wherein each of said two or more storage chambers may be filled with different type of dispensable objects; and
    wherein a switching mechanism is disposed between said two or more storage chambers and said dispensing mechanism, said switching mechanism is configured to allow switching between two or more storage chamber selection modes, each of said two or more storage chamber selection modes corresponding to another of said two or more storage chambers; and
    wherein switching to each of said two or more storage chamber selection modes causes said switching mechanism to allow passage of dispensable objects toward the outlet opening only from the storage chamber corresponding to the selected storage chamber selection mode, while blocking passage of dispensable objects from the remaining of said two or storage chambers.

8. The device of claim 1, wherein the device is adapted for use in medical procedures.

9. The device of claim 1, wherein the device is adapted for use in manual work.

10. The device of claim 1, wherein the device is adapted for use in military and paramilitary operations.

11. The device of claim 1, wherein said dispenser housing comprising at least one partially enclosed area in connection with said storage chamber and said outlet opening, said at least one partially enclosed area is defined by a movable barrier constituting part of said dispensing mechanism operable by said activation means;
    wherein when said activation means is in resting position, said movable barrier allows passage of at least one of said dispensable objects from said storage chamber into said at least one partially enclosed area while blocking passage from said at least one partially enclosed area toward said outlet opening; and
    wherein pressing said activation means to activate said dispensing mechanism triggers said movable barrier to block passage from said storage chamber toward said at least one partially enclosed area and to allow passage of at least one of said dispensable objects in said at least one partially enclosed area out of said dispenser housing through said outlet opening.

12. The device of claim 11, wherein an internal opening is disposed between said storage chamber and said partially enclosed area, said internal opening having a fixed width.

13. The device of claim 12, wherein an aperture adjuster is movably installed adjacent to said internal opening, said aperture adjuster is movable and fixable in various positions within a range of movement allowing to partially cover said internal opening to set its width, thereby limiting the size or quantity of dispensable objects that can pass through said internal opening; and wherein position of said aperture adjuster is controlled by an adjustment means operatively coupled to said aperture adjustment and being accessible from external side of said dispenser housing.

14. The device of claim 13, wherein said aperture adjuster allows setting the width of said internal opening within any range between 5 mm and 40 mm.

15. The device of claim 1, wherein said activation means is an activation handle.

16. The device of claim 15, wherein said activation handle in its resting position is positioned in an angle between 0 and 60 degrees relative to the plane on which said dispenser housing is resting when fixed around the wrist.

17. The device of claim 15, wherein said activation handle is formed by two or more parts, a proximal part operatively coupled to said dispensing mechanism and one or more distal parts connected serially to said proximal part; and
    wherein said one or more distal parts are contractible and expandable to allow setting said activation handle in two positions: an open position wherein said one or more distal parts are expanded to form an extension of said proximal part, thereby allowing said activation handle to be pressed by folding of the fingers of the hand on which the device is worn, and a closed position wherein said one or more distal parts are contracted towards said proximal part.

18. The device of claim 17, wherein said activation handle is configured to expand into said open position when the device is tilted such that said outlet opening is facing downwards, and to contract into said closed position when the device is tilted such that said outlet opening is facing upwards.

19. The device of claim 17, wherein said activation handle is configured to expand into said open position when the device is rapidly shaken to propel movement of said one or more distal parts in direction of expansion.

20. The device of claim 1, wherein the device is a pet training device; and wherein said dispensable objects are pet snacks.

21. The device of claim 20, further comprising a sound producing element operatively coupled to said activation handle, such that pressing said activation handle triggers said sound producing element to produce a sound.

22. A method for training pets using the device of claim 20, comprising the steps of:
    i. filling said storage chamber with pet snacks;
    ii. fixing said dispenser housing around wrist using said strap;
    iii. initiating training of a pet;

iv. upon demonstration of satisfactory behavior by said pet, pressing said activation means to trigger release of pet snacks into the hand on which said dispenser housing is worn;
V. feeding said pet with said pet snacks released from said dispenser housing.

* * * * *